Oct. 18, 1938.   P. B. DRANE   2,133,381
RELIEF VALVE
Filed Dec. 24, 1936

Philip B. Drane
INVENTOR

ATTORNEY

Patented Oct. 18, 1938

2,133,381

UNITED STATES PATENT OFFICE 2,133,381

RELIEF VALVE

Philip B. Drane, Tulsa, Okla.

Application December 24, 1936, Serial No. 117,641

5 Claims. (Cl. 277—13)

The invention relates to relief valves for oil storage tanks, and has for one of its objects to provide a relief valve whereby gas from one or more tanks may be conveyed to a point of ignition remote in relation to the tanks through a discharge line, and means whereby any of the relief valves may be opened for testing purposes.

A further object is to provide a pressure relief line having a connection to the relief valve carried by the tank and forming by-pass means through which normal gases within the tanks will pass to the pressure relief line and be conveyed to a point of ignition and consumption. Also means whereby when the relief valve is opened for access to the tank, said tank will be automatically disconnected or cut off from the pressure relief line, thereby preventing flow of gas from other tanks on the relief line to the opened tank.

A further object is to provide the relief valve with an auxiliary valve adapted to be opened by a vacuum within the tank, for instance during an emptying operation, thereby preventing collapse of the wall of the tank.

A further object is to yieldably mount the vacuum relief valve and to proportion the same whereby when the relief valve as a whole is slammed to closed position, the vacuum relief valve will be suddenly unseated and released for a hammering operation on its seat for preventing sticking of the valve to the seat.

A further object is to provide the vacuum valve with means whereby it will be prevented from following the pressure plate valve in its upward movement, thereby increasing the gas discharge area upon sudden expansion of gases.

A further object is to yieldably mount the relief valve and vacuum relief valve on a hinged member extending over the tank opening and latch means carried by the free end of the hinged member and adapted to latch the hinged member in closed position, for instance after a theft operation. Also to provide the latch means with portions adapted to be moved by the operator for a relief valve opening operation.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
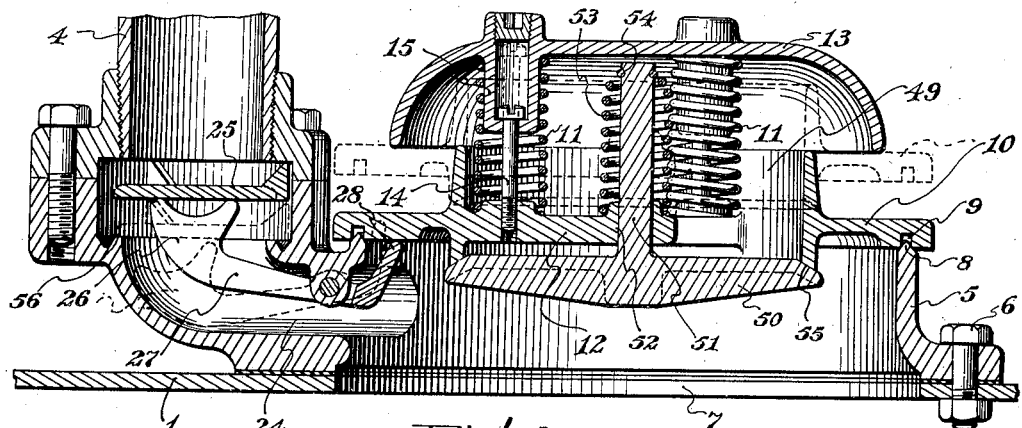
Figure 1 is a vertical longitudinal sectional view through one of the relief valves, its by-pass and a portion of a tank.

Referring to the drawing, numeral 1 designates the top of an oil storage tank. Gases of various pressure are created within the tanks from natural causes or from heat, for instance the heat of the sun, and it is desirable to convey this gas to a point remote in relation to the tanks and burn the same. To accomplish this result a relief pressure pipe 4 is provided, which pipe is connected to the relief valve casing 5, which is secured to the upper ends of the tank by means of bolts 6. The relief valve casing 5 extends around the tank opening 7, as shown in Figure 1, and extends upwardly and is provided with a stationary valve seat 8, which is received within the packing groove 9 of the relief valve plate 10. The relief valve plate 10 is normally seated as shown in Figure 1, and only comes into operation when there is a sudden generation of gas pressure within one of the tanks to which it is applied, and then it unseats to the dotted line position shown in Figure 1, thereby allowing rapid escape of the gas to the atmosphere until the pressure is less than the expansive action of the springs 11, which are interposed between the spider 12 of the valve plate 10 and the relief valve hood 13. The downward movement of the plate 10, under the influence of the springs 11, is limited by the headed bolts 14 within the hood bosses 15.

This application pertains to valves of the type disclosed in my application, Serial No. 185,243, filed January 15, 1938.

Figure 2:
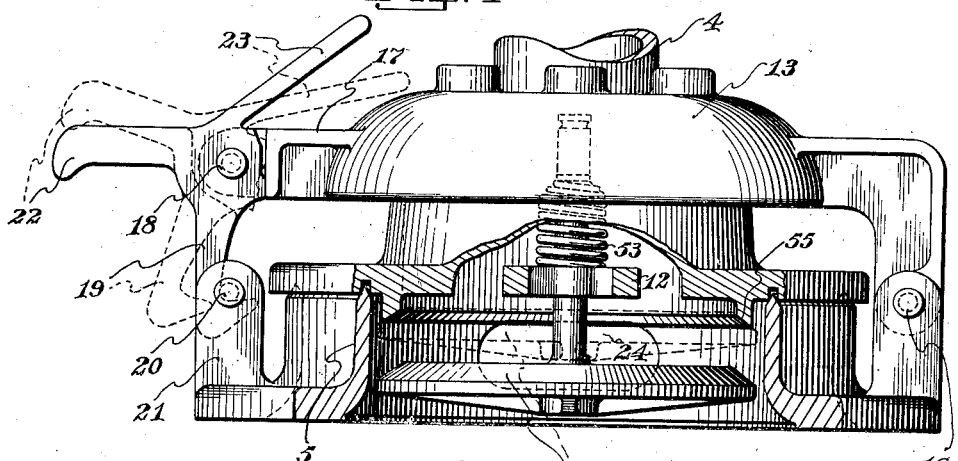
Figure 2 is a side elevation of one of the relief valves, parts being broken away to beter show the structure.
Figure 3:
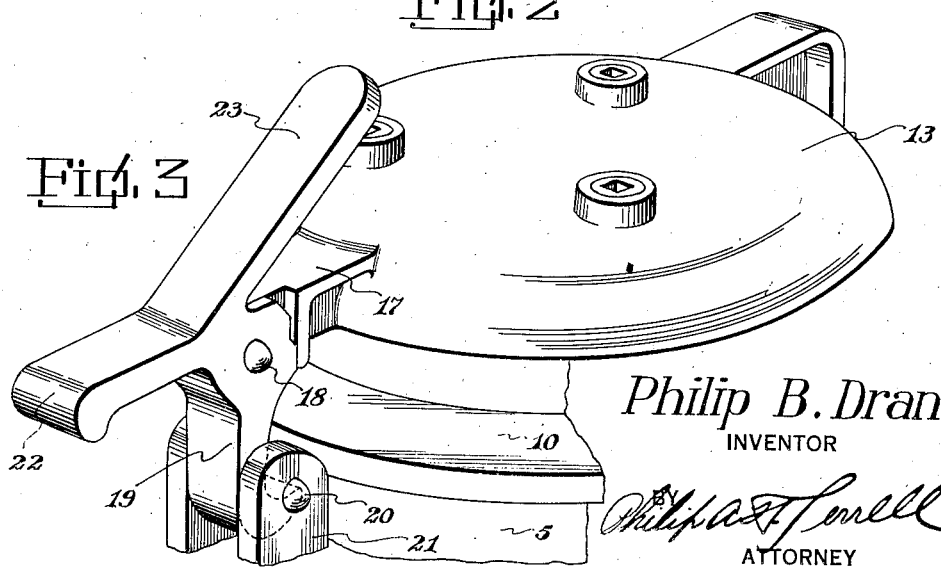
Figure 3 is a perspective view of a portion of one of the relief valves, showing the latching means.

The hood 13 is hingedly connected at 16 to the casing 5 and terminates at its free end in an arm 17 to which is pivotally connected at 18 a downwardly extending hooked latch 19, which is adapted to hook under a member 20, connecting the ears 21 carried by the valve casing 5 as clearly shown in Figure 2, thereby holding the hood 13 in closed position with the relief valve plate 10 seated on the seat 8. The latch 19 is provided with an arm 22, adapted to be engaged by the toe of the operator for unlatching the device if desired and with a second arm 23, which may be engaged by the toe of the operator for an unlatching operation, for instance when it is desired to open the relief valve for a theft operation, which involves the removal of samples of the oil for test purposes. Under normal conditions the plate 10 remains seated until there is a rapid or excess pressure which can not be handled through the pipe 4.

As gas is generated within the tank, it rises upwardly and passes through the relief pipe 4, and in its passage it passes through the discharge ports 24, past the unseated valve 25, which is held open by the weighted end 26 of the valve operating pivoted lever 27, which is provided with arm 28 in the path of the relief valve plate 10, and which plate maintains the by-pass valve 25 open. The gases from the tank pass into the pressure relief line 4 and through said line to a point of discharge.

The relief valve plate 10 is provided with a central opening 49, which is normally closed by an inwardly operating vacuum relief valve 50. When the oil is being pumped or discharged from a tank, a vacuum is created within the tank, which has the tendency to collapse the walls thereof, inwardly and should the by-pass, from the other connected tanks, be too small to breathe in from the other tanks, the vacuum valve 50 is designed to open from a vacuum overload and to allow an inflow of air through the hood 13 and through the passage 49, in the relief valve plate 10. The gases and pressure equalize in all the tanks, by means of the relief pressure pipe 4, which forms an open communication between them all, except when the gager opens the valve, at which time that particular tank is cut off from the rest.

Vacuum relief valve 50 is provided with a stem 51, which is slidably mounted in a bearing 52 of the spider 12 carried by the plate 10 and extends upwardly, and is normally held in upper position by means of an expansion spring 53 interposed between the spider 12 and anchored in a groove 54 in the upper end of the stem 51. It will be noted that stem 51 terminates at its upper end adjacent the hood 13, therefore it will be seen that when the relief valve, as a whole, is opened and is slammed after an inspection operation, the springs 11 will be compressed, and the upper end of the stem 51 will be engaged by the hood 13, which will cause a quick unseating of the vacuum valve 50 and spring actuated engagement of the valve, thereby preventing sticking of the valve 50 and obtaining a hammering action on its seat 55, which will dislodge any solidified material. Immediately upon the closing of the relief valve the lever 27 will be rocked by the plate 10, and its weighted arm 26 will again unseat the by-pass valve 25.

It will be seen that when it is desired to inspect the interior of the tank or take a sample of the contents thereof, it will only be necessary for the operator to release the latch 19, using his foot, then hinge the entire relief valve structure to open position on its pivotal point 16. As the device moves toward open position the weighted arm 26 of the rock lever 27 moves downwardly, thereby allowing the valve 25 to seat on its seat 56, consequently the particular tank is cut off against the inflow of gas from the pressure relief line and from other tanks, through the pressure relief line.

When there is a sudden and excessive generation of gas within the tank or rapid expansion thereof, for instance from heat or sun rays, the plate valve 10 unseats, and upon extreme upper movements, for instance to the dotted line position shown in Figure 1, the vacuum plate 50 is unseated, thereby allowing passage of gas through and around the plate 10 and through the passage 49. In this way very nearly the entire volume of gas can be accommodated to the cross sectional area of the tank opening.

The invention having been set forth what is claimed as new and useful is:

1. The combination with a pressure actuated relief valve, a casing on which said relief valve is mounted, said relief valve being capable of manual movement away from said casing, of a by-pass valve carried by said casing, said by-pass valve being normally opened when said relief valve is in place on the casing and held open by said relief valve and so constructed and arranged that when the relief valve is manually moved from the casing said by-pass valve will be closed.

2. A device as set forth in claim 1 including an extension casing carried by the relief casing and in which the by-pass valve is disposed.

3. A device as set forth in claim 1 including an extension casing carried by the relief valve casing and in which the relief valve is disposed, a valve seat in the extension casing and with which the by-pass valve cooperates, a lever rockably mounted between the relief valve and the by-pass valve and normally maintaining the by-pass valve open when the relief valve is in place on the casing and allowing the seating of the by-pass valve when the relief valve is manually moved from the casing.

4. The combination with a pressure actuated relief valve closed under normal pressures and manually movable to an open position, of a by-pass valve in connection therewith, said by-pass valve being so constructed and arranged as to be normally held open by the relief valve when the relief valve is closed, and as to produce closure of said by-pass valve when the relief valve is manually moved to open position.

5. A device as set forth in claim 1 wherein the relief valve is hingedly connected to one side of the relief valve casing.

PHILIP B. DRANE.